Nov. 21, 1933.       R. L. DEZENDORF       1,936,425
                      METER INDICATOR
                    Filed March 26, 1932
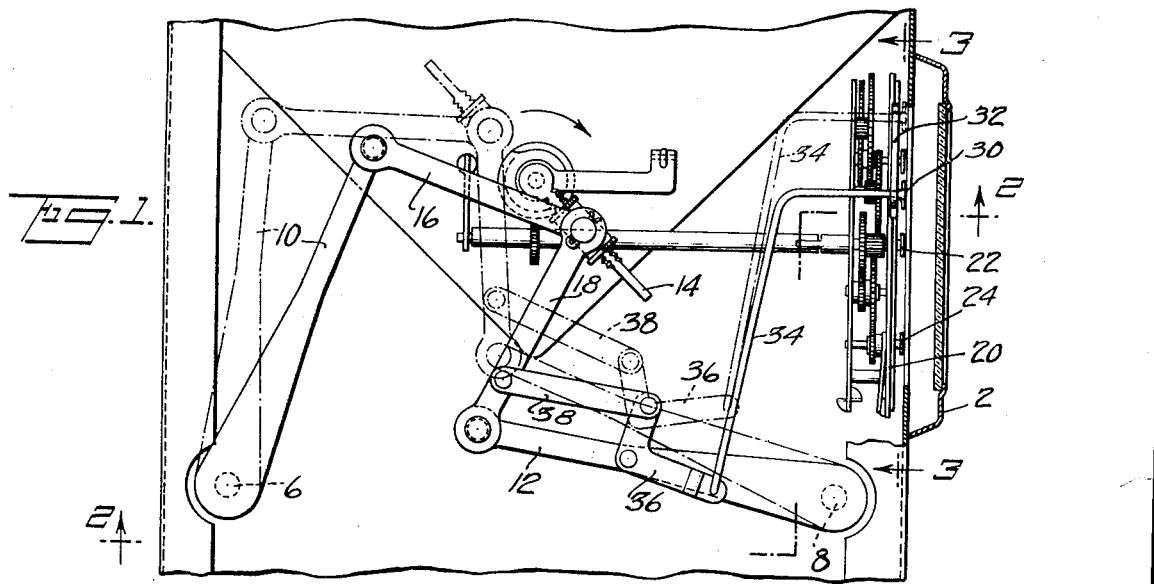
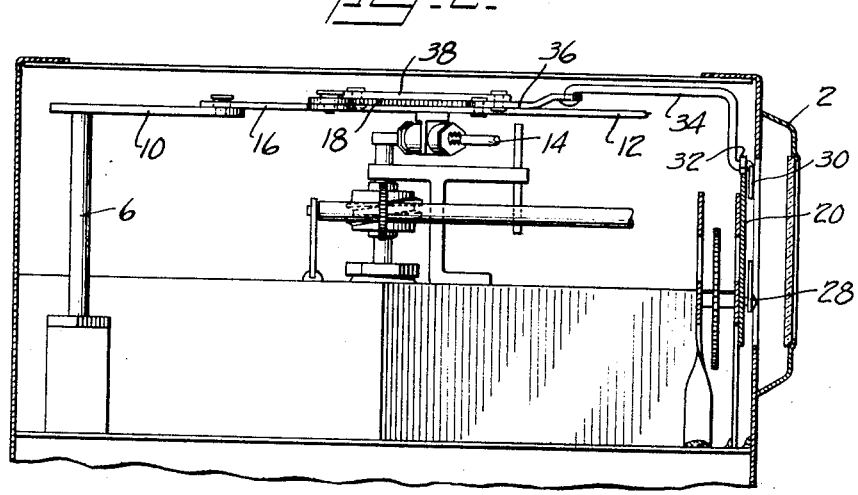
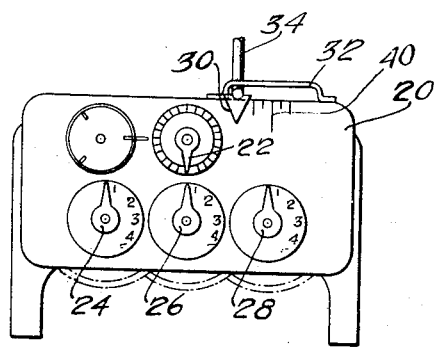
INVENTOR
Richard L. Dezendorf
BY
ATTORNEYS Patented Nov. 21, 1933

1,936,425

UNITED STATES PATENT OFFICE 1,936,425

METER INDICATOR

Richard L. Dezendorf, Hollis, N. Y.

Application March 26, 1932. Serial No. 601,316

2 Claims. (Cl. 116—117)

My invention relates to gas meters, and has special reference to indicating devices for such meters.

One of the objects of the invention is to provide a device of this character which is extremely sensitive to the passage of a comparatively small amount of gas through the meter and which will at all times indicate the rate of flow of the gas.

Another of the objects of the invention is to provide a novel and improved indicating device of the character referred to for a gas meter.

Referring to the accompanying drawing:—

Fig. 1 is a plan view, partly in section and with its top plate removed, of a meter embodying the features of my invention in their preferred form;

Fig. 2 is a sectional elevation taken on the line 2—2 of Fig. 1; and

Fig. 3 is a front view of the dial and associated parts of the meter with the front of the casing removed.

The meter illustrated in the drawing is provided with a casing 2 having a gallery 4 containing the usual rear flag wire 6 and front flag wire 8 to which are respectively connected lower flag arms 10 and 12. These flag arms are connected to the tangent 14 by upper flag arms 16 and 18 in the ordinary manner. The dial 20 of the indicator is provided with the usual two foot pointer 22 and pointers 24, 26 and 28 for indicating in their respective revolutions, one thousand feet, ten thousand feet, and one hundred thousand feet, respectively, and for partial revolutions the various tenths thereof. None of these indicators, however, move rapidly enough for indicating the small amount of gas desirable for making a quick test, or for determining a comparatively slight leakage of gas through the meter.

In accordance with the present invention, an indicating device 30 is employed which is extremely sensitive to the flow of gas through the meter so that the rate of flow may at once be determined.

As shown, this indicating device is mounted to slide back and forth in a guide-way that may be provided by one edge of the dial 20 and a suitably formed strap 32 secured to said edge. The device 30 is in the form of a pointer that is carried on the end of a wire or rod 34. The other end of this rod is pivotally connected with one arm of a bell crank 36 mounted on the lower flag wire 12. The other arm of the bell crank 36 is connected by a link 38 with the upper flag wire 18.

With this construction, during each revolution of the tangent, the indicating pointer 30 makes one complete back and forth movement. In the ordinary meter, the tangent makes three revolutions for each half foot of gas passing. Accordingly, by observing the pointer 30, the rate of flow may be readily determined. Also, by means of indicating marks 40 on the dial the amount of gas flowing for any given period less than one complete revolution of the tangent.

The connection between the pointer 30 and the flag arms is such as to ensure visible movement of the pointer during movement of the tangent. While the movement of the flag arm 12 is arrested as it passes its dead center with relation to the upper flag arm 18, the latter moves appreciably at all times during the rotation of the tangent which ensures visible movement of the pointer, the combined movements of both the upper and lower flag arms in an increased degree being transmitted to the pointer.

As will be evident to those skilled in the art, my invention permits various modifications without departing from the spirit thereof or the scope of the appended claims.

What I claim is:

1. In a gas meter, a tangent, means comprising upper and lower flag arms for operating the tangent, an indicator mounted for limited movement in opposite directions, and connections between the indicator and said lower and upper flag arms for thus moving the indicator, the combined movements of the lower and upper flag arms being transmitted to the indicator.

2. In a gas meter, a tangent, means comprising upper and lower flag arms for operating the tangent, an indicator mounted for limited movement in opposite directions, and connections between said indicator and the lower and upper flag arms comprising a bell-crank mounted on the lower flag arm, a link connecting one arm of the bell-crank with the upper flag arm whereby movement of the upper flag arm is transmitted to the bell-crank, and connections between the other arm of the bell-crank and said indicator.

RICHARD L. DEZENDORF.